United States Patent [19]

Kratt et al.

[11] 3,934,121

[45] Jan. 20, 1976

[54] COUNTER MEANS

[75] Inventors: Kurt Kratt, Aldingen; Josef Gruler, Aixheim; Guenther Hauser, Trossingen; Reinhard Irion, Aldingen, all of Germany

[73] Assignee: J. Hengstler K.G., Aldingen, Germany

[22] Filed: July 12, 1974

[21] Appl. No.: 488,177

[30] Foreign Application Priority Data

July 18, 1973 Germany ........................ 2336544

[52] U.S. Cl. .................... 235/61.6 R; 235/61.11 C; 235/61.12 R

[51] Int. Cl.² .................... G06K 7/04; G06K 19/06

[58] Field of Search .. 200/46; 340/305, 306, 149 A; 346/82, 134, 44; 235/61.1, 61.11 R, 61.11 A, 61.11 B, 61.11 D, 61.11 E, 61.6 R, 61.6 A, 92 C, 92 FL, 61.6 J, 61.12 R; 271/238

[56] References Cited

UNITED STATES PATENTS

| | | | |
|---|---|---|---|
| 3,644,711 | 2/1972 | Haller | 235/61.1 |
| 3,644,717 | 2/1972 | Voegelin | 235/92 C |
| 3,740,759 | 6/1973 | McKeegan | 346/44 |
| 3,812,329 | 5/1974 | Tatsuno | 235/92 FL |
| 3,850,426 | 11/1974 | Blair | 271/238 |

*Primary Examiner*—Daryl W. Cook
*Assistant Examiner*—Robert M. Kilgore

[57] ABSTRACT

The counter means serve for a counting of events. A counter is provided as well as a code detector adapted to receive a coded punched card in a predetermined position. Counter control means are operable to control said counter in response to the arrival of said card in said predetermined position. Said code detector comprises replaceable, pivoted code detector elements, which represent a predetermined code and are adapted to enter holes in said punched card if, and only if, said holes also represent said predetermined code. Said code detector prevents a movement of said card to said predetermined position unless said code detector elements have entered said holes in said card.

7 Claims, 24 Drawing Figures

Fig. 1
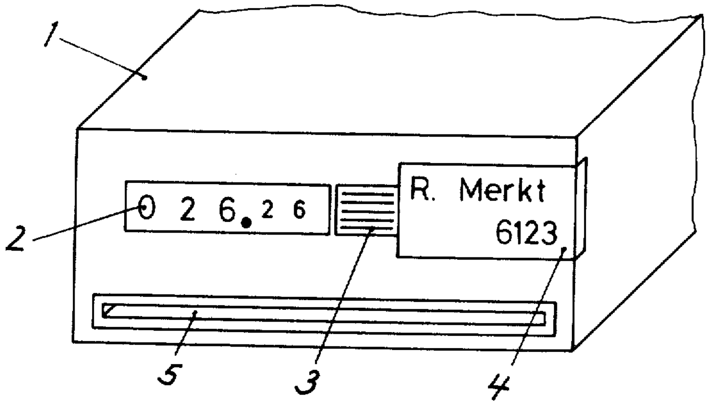
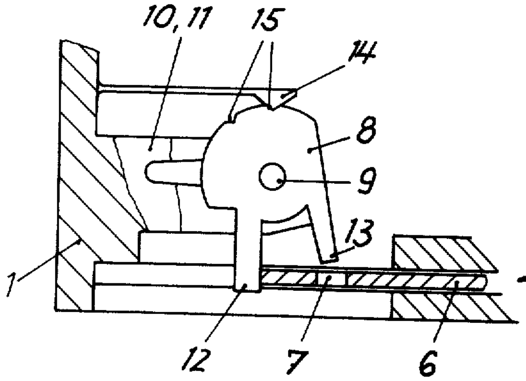
Fig. 2
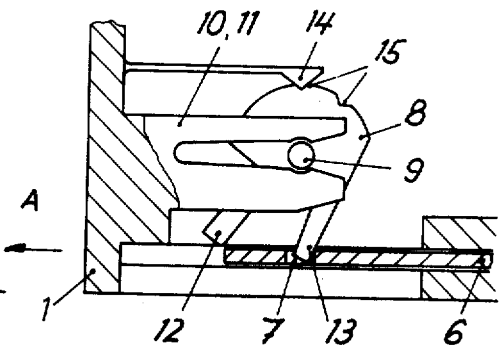
Fig. 3
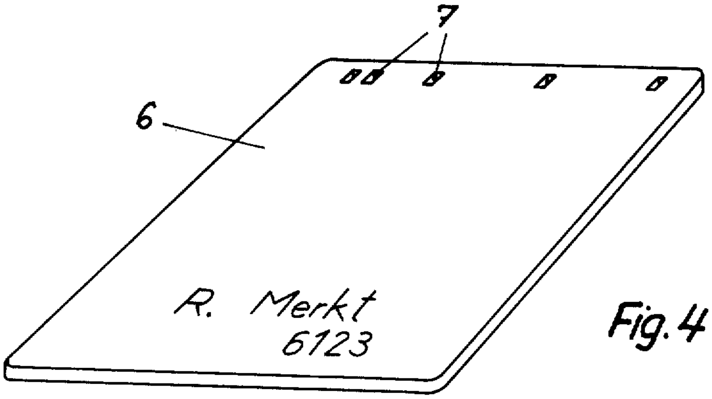
Fig. 4

Fig. 7
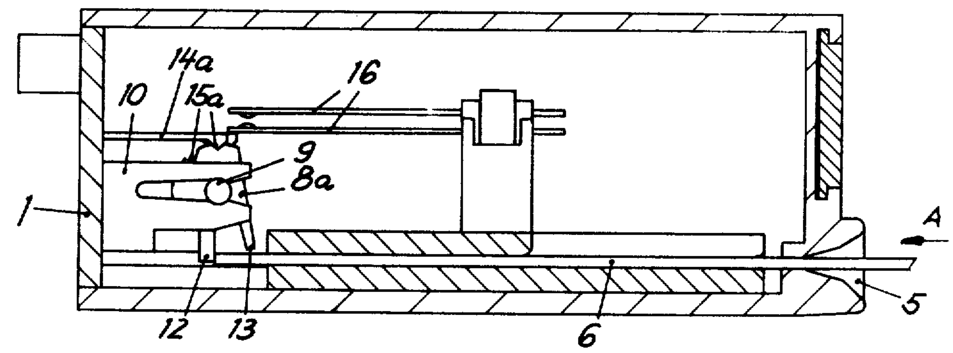
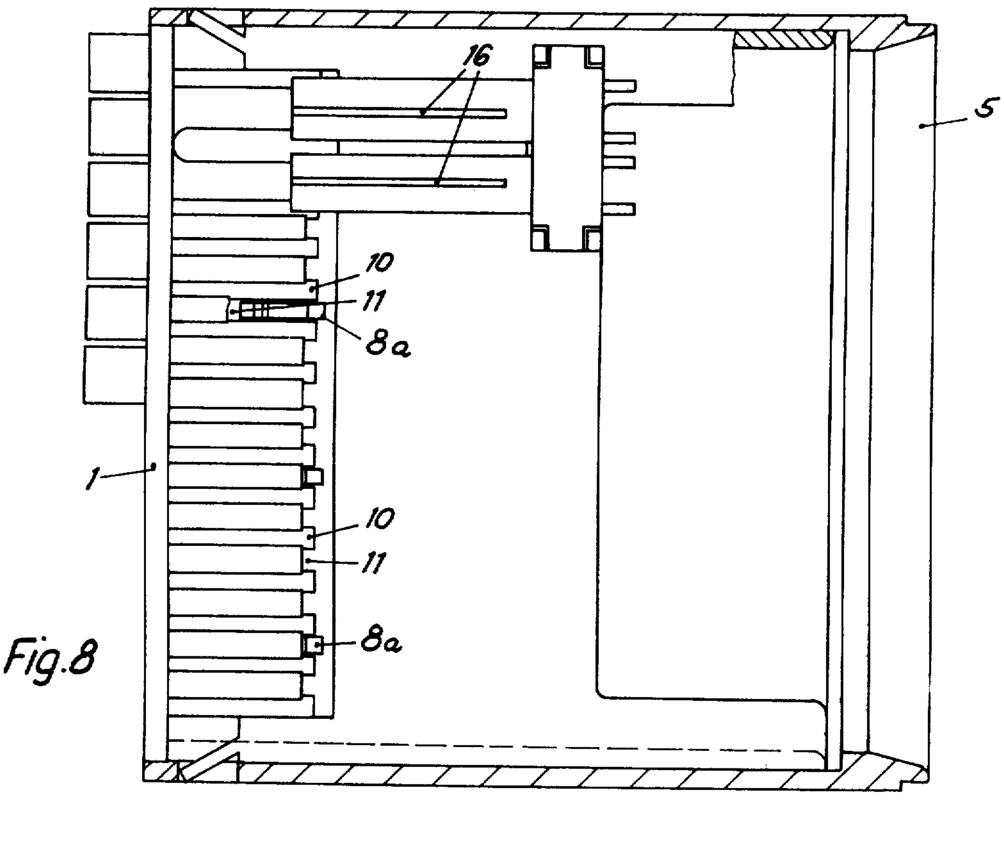
Fig.8

Fig. 12
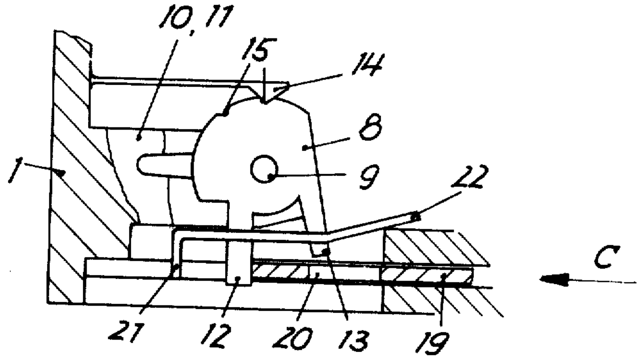
Fig. 13
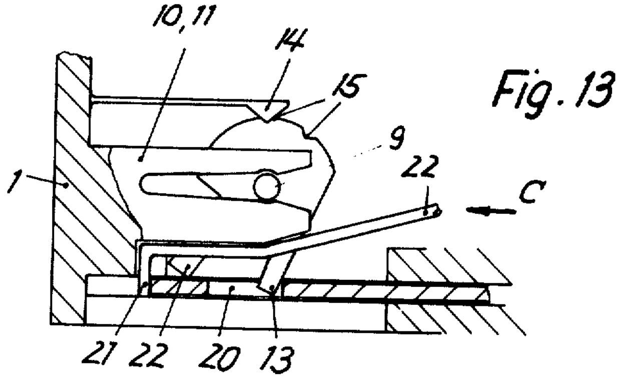
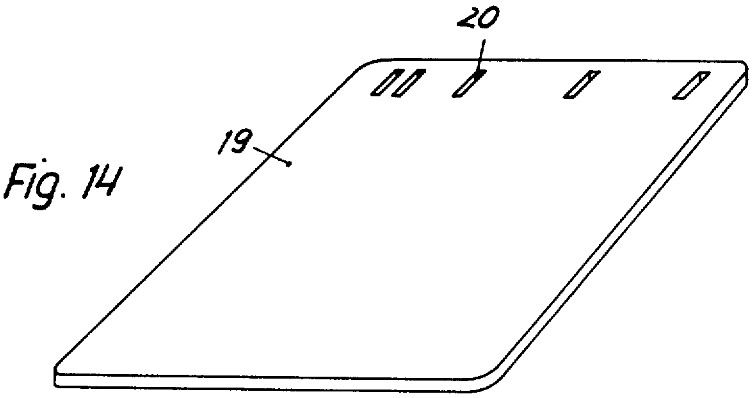
Fig. 14

COUNTER MEANS

This invention relates to particularly compact counter means for counting events, particularly for a recording of time in organizations having sliding working hours.

In connection with the increasing adoption of sliding working hours, times are recorded by counters so that extensive counter arrays are required particularly in large plants having numerous employees.

It is an object of the invention to provide time-recording means, which can be used in such large counter arrays and involve lower costs. This object has been accomplished according to the invention by the provision of a unit, which includes a counter and a card verifier and enables also the use of conventional coded cards in the form of identity cards of plastics material, such as are known, e.g., as so-called check cards, for starting and stopping the recording. These cards are somewhat larger than is required for the inscriptions and identification codes provided on the cards. The use of these cards, which are already in existence for numerous other identification functions, also for the control of the counter for recording sliding working hours eliminates the need for special identity cards for data counters. This is another object of the invention.

The invention relates to counter means for counting events, particularly for recording time, which counter means can be started by means of a coded card and comprises a card verifier including a number of code detector elements for cooperating with the coded card, which card verifier responds to the detection of the allocated code by permitting the card to start the counter. For this purpose, the counter means are characterized in that the code detector elements are pivoted and replaceable and provided with teeth, which are adapted to enter holes in the punched card inserted into the card verifier, switch contacts are preferably provided, which are associated with one or more code detector elements, and the counter and card verifier form a unit, preferably a plug-in unit.

Another object of the invention is to reduce costs and to provide protection against an unauthorized or unintended reset. This object is accomplished by the provision of a specific reset card, which can be inserted through the card-receiving slot to actuate means for resetting the counter. The reset means, which are thus operated act only on part of the digits, whereby the counter is further simplified. This partial reset results in further advantages in use because only hours should be read and used in the calculation. The values of the two digits, which are not reset to zero remain in storage.

The following advantages are afforded compared to known designs:

1. As a result of the combination of the counter and card verifier, the unit has smaller dimensions for given sizes of the digit and of the identity card whereas the unit still consists of a plug-in unit.

2. The provision of novel allocation code elements in the form of marginal holes permits of the use of a thinner card of plastics material. The marginal holes are disposed in the margin, which is not used for conventional codes, so that cards of plastics material used for another purpose may be used also for the identification required in connection with the recording of sliding working hours.

3. The allocation code detector elements act mechanically and can be changed to a defferent code when the unit has been opened.

4. The code detector elements are designed to snap into the inserted card and to start the counter, e.g., by means of a contact at the same time.

5. The partial reset of the counter eliminates parts and substantially improves the reliability in operation. The clutch is eliminated as well as the clutch drive wheel. Besides, the reading and transfer are simplified as well as the calculation because the number of digits to be considered is reduced by two.

6. The initiation of the reset by means of a special reset card reduces the costs of the counter because the reset key is eliminated. Besides, an unintended or unauthorized reset is prevented without need for special means, such as covers or interlocks. If the allocation code is shared, e.g., by a group, the reset card may also be allocated to the counter array.

7. In the embodiment comprising a contact, one or more additional contacts are provided for a simultaneous initiation or switching of additional operations. This one additional contact or these additional contacts are adapted to be operated by one identity card at the same time or are alternatively operable by different identity cards. A selection between alternative switching operations may be provided for in that the card is inserted in a normal or, e.g., inverted orientation. This has the advantage that there is no need for an additional identity card for initiating these alternative switching operations.

Further details of illustrative embodiments of the counter means according to the invention will now be described and explained with reference to the drawing, in which FIG. 1 is a front elevation showing a counter unit consisting of a counter, plug means and code detector.

FIGS. 2 and 3 are sectional views showing the code detector before and during its operation.

FIG. 4 is an elevation showing the associated coded punched card.

FIGS. 7 and 8 are, respectively, transverse and longitudinal sectional views showing the plug means, code detector and contact means.

FIGS. 12 and 13 are sectional views showing a code detector and reset means before and during the operation, respectively.

FIG. 14 is an elevation showing the associated coded reset card.

Figure 5:
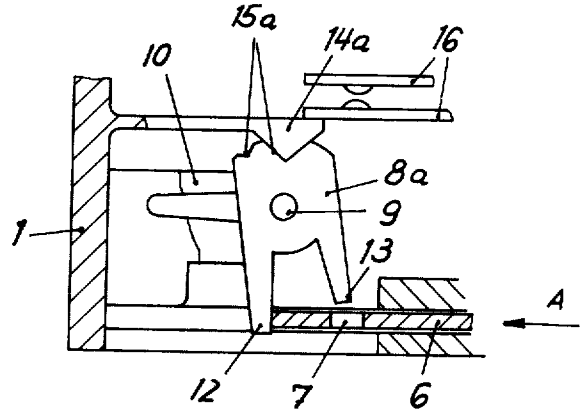
FIGS. 5 and 6 are sectional views showing contact means before and during the operation of the contact.

FIG. 1 shows the forward side of a counter unit 1, which constitutes a plug-in module including a counter mechanism 2, a signal area 3 for indicating the switched condition, an identification area 4, and a slot 5 for receiving a punched identity card 6, such as is shown in FIG. 4. The margin of the card has punched code holes 7, which allocate the card to a specific counter and to a specific person or item.

FIGS. 2 and 3 show pivoted gearlike code detector elements 8, which are replaceably mounted in resilient holders 10 by means of end pins 9. The code is selected in that the gear elements are snapped into associated receiving slots 11. It is apparent that the marginal holes 7 of the punched cards 6 can cooperate with the stop finger 12 and switching finger 13 of a gearlike code detector element 8 so that a punched card 6 can be inserted in the direction A if it is provided with the proper hole code whereas other punched cards are blocked. The punched card 6 is adapted to be located in a non-inserted position and an inserted position because a detent spring 14 cooperates with two detent notches 15.

Figure 6:
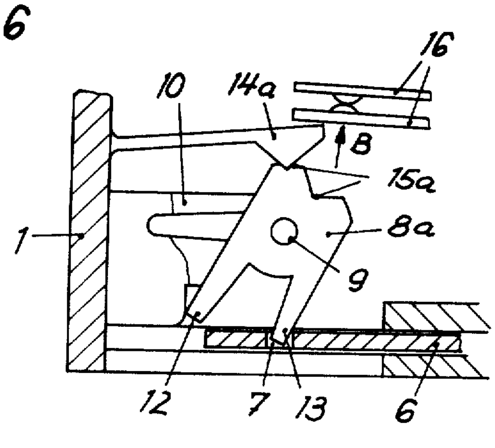

FIGS. 5 and 6 show how such code detector element 8*a*, which has also end pins 9 mounted in resilient holders 10, cooperates with detent springs 14*a*, which cooperate with detent notches 15*a* having different elevations and with switch contacts 16 as the corresponding punched card 6 is inserted. In this connection, FIGS. 7 and 8 show in a sectional view and a top plan view by way of example a complete arrangement of snap-in code detector elements 8*a* in receiving slots 11 of the kind described hereinbefore. When actuated by the punched card 6, the grooves 15*a* of the code detector elements act on the detent springs 14*a*. These grooves 15*a* have different elevations and control the switching stroke "B" of the contact springs 16 for different switching functions. In this representation the counter unit 1 having a receiving slot 5 and a punched card 6 are shown at the beginning of the operation performed as the card is inserted in the direction A.

Figure 9:
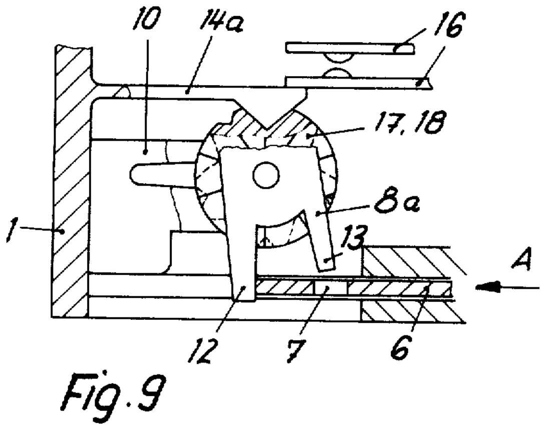
FIGS. 9 to 11 are, respectively sectional views showing bistable contact means and a stepping ratchet mechanism before and during the operation and a top plan view thereof.
Figure 10:
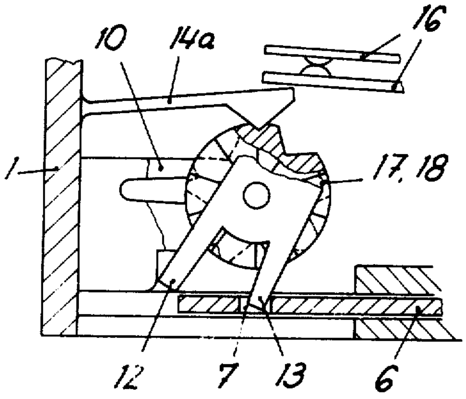
Figure 11:
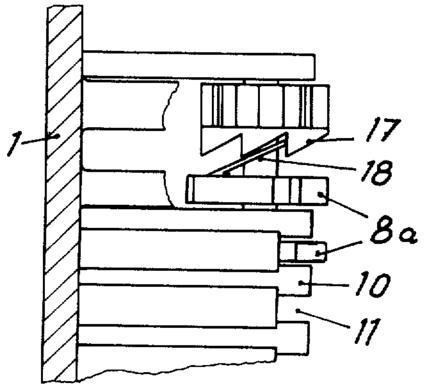
Figure 15:
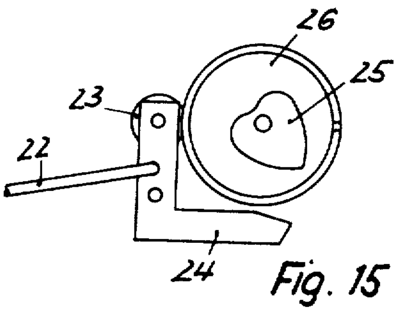
FIGS. 15 to 18 are, respectively, elevations and top plan views showing the reset means before and during the operation.
Figure 17:
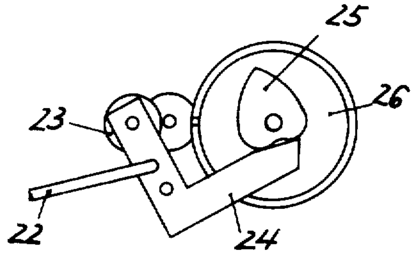
Figure 16:
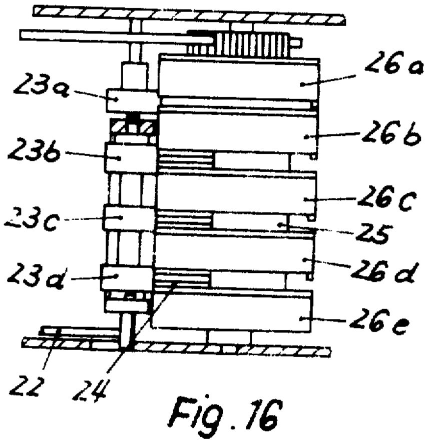
Figure 18:
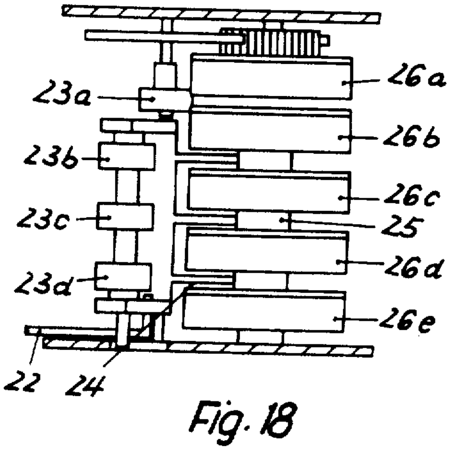
Figure 19:
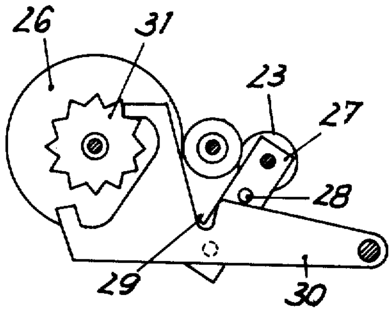
FIGS. 19 to 22 are, respectively, elevations and top plan views showing the locking means before and during the reset.
Figure 21:
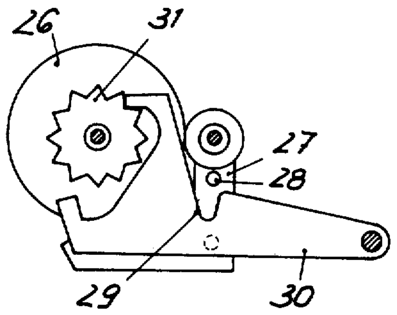
Figure 20:
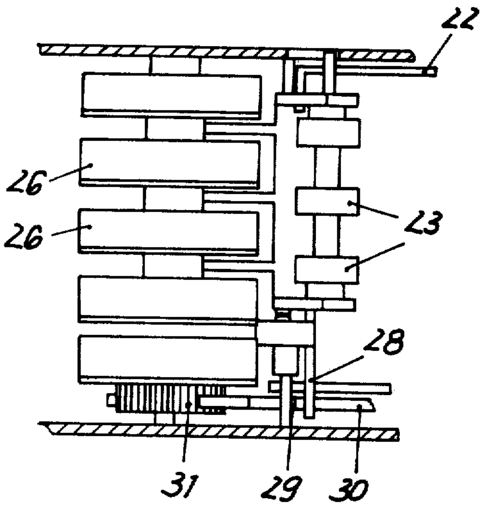
Figure 22:
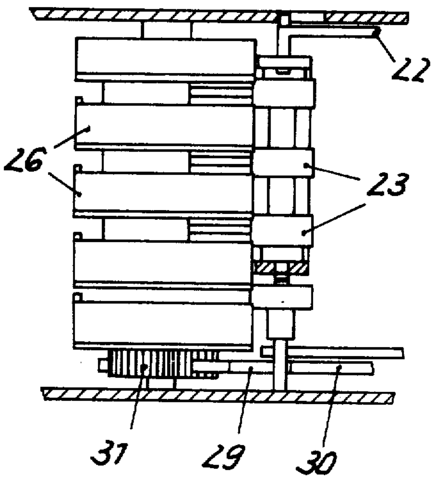

FIGS. 9 and 10 show also code detector elements together with detent springs and contact springs as shown in FIGS. 5 and 6. By the provision of a stepping ratchet mechanism 17, 18, known per se, the switching function is extended to provide a bistable switch, which serves, e.g., to close a pulse-generating circuit. In other words, if the pulse-generating circuit is open when the properly coded punched card 6 is inserted, i.e., when the employee is "arriving", the pulse-generating circuit will be closed thereby to initiate the recording of working hours, and when the card is inserted for the next time, when the employee is "leaving", the pulse-generating circuit will be opened thereby. In the embodiment described before, the punched card must remain inserted to close the pulse-generating circuit.

FIGS. 12 and 13 illustrate the operation of reset means by the insertion of a reset card 19 as shown in FIG. 14 in conjunction with the code detector means described hereinbefore. To increase the length of the insertion path C of the reset card 19, the same is provided with slots 20 rather than holes. As the reset card is inserted further, it causes the tie rod 22, which is angled at 21, to move in the direction C so that the counter, with the drive wheels 23 disengaged, is reset by the operation of reset levers 24 acting on heart-shaped cams 25 mounted on the digit wheels 26. This is shown in FIGS. 15 to 18. In this case the known reset function performed by means of the reset levers 24 and heart-shaped cams 25 when the drive wheels 23 are disengaged is restricted to the digits 26*c* to 26*e* whereas there are no reset means for the first two digits 26*a*, 26*b*. The first drive wheel 23*a* has a fixed axis, different from the following drivers 23*b* to 23*d*.

According to FIGS. 19 to 22, in an arrangement, which comprises a reset key and a partially resettable counter the stepping is prevented during the operation of the resetting means. For this purpose, a locking pin 28 is provided, which is associated with the drive wheel carrier 27 and is normally disposed in a recess 29 of the stepping rocker 30, to permit the latter to operate the stepping gear 31. In response to an operation of the reset means, the locking pin 28 is moved out of the recess 29 to a position, in which the rocker 30 is blocked. In counters, which are only partly resettable, this arrangement prevents a carry from the non-resettable part of the counter during the reset operation.

A stepping, e.g., from a count of 99 to 00, during a reset operation would otherwise cause said count to be lost because there is no carry to the resettable part of the counter.

Figure 23:
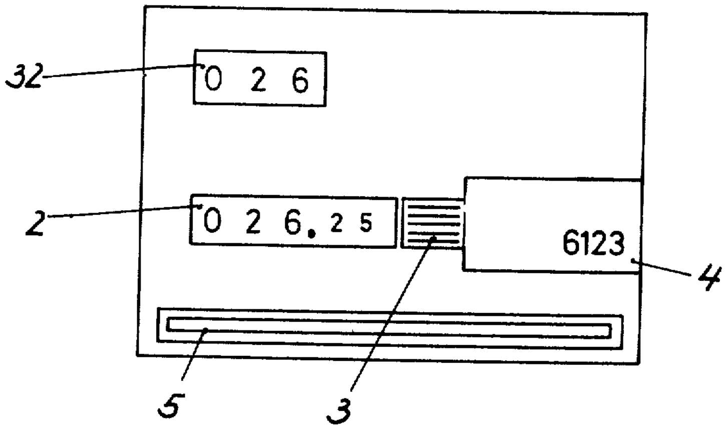
FIG. 23 is an elevation showing a digit combination with an additional counter.
Figure 24:
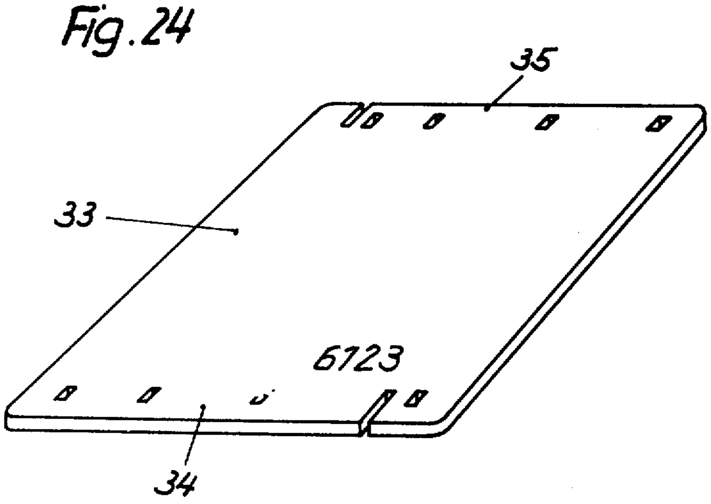
FIG. 24 is an elevation showing the associated punched card having holes on both sides.

FIG. 23 shows two digit wheel sets 2 and 32, which are driven by a common drive wheel set. The additional counter 32 is preferably used to record partial times worked on a given job and can be read out for a recording of data. That extended counter arrangement may be used to count events in such a manner that the time worked on to specific jobs is recorded as well as the time of the sliding working hours or hours of attendance. Because the same drive wheel set is used for both digit wheel sets, the time worked on a given job can be recorded only simultaneously with a recording of the time of attendance.

In the application described by way of example, the means for reading out the additional counter for the job times is used to control a printer for printing job time tickets. Locking means are provided, which are known per se for this purpose and which control the sequence, in which data are transferred so that a wrong operation is prevented.

In this embodiment, the punched card 33 is coded at both ends and when inserted with the first end 34 starts the counting and when inserted with the second end 35 initiates the print-out operation, which may be succeeded by an automatic reset, if desired.

What is claimed is:

1. Counter means for a counting of events which comprises:

a counter;

a code detector adapted to receive a coded punched card in a pre-determined position; and counter control means operable to control said counter in response to the arrival of said card to said predetermined position;

said code detector comprising replaceable, pivoted code detector elements, which represent a pre-determined code and are adapted to enter holes in said punch card, if, and only if, said holes also represent said pre-determined code;

said code detector preventing movement of said card to said pre-determined position unless said code detector elements had entered said holes in said card;

said code detector comprising further a plastics material structure which carries resilient holders, said resilient holders disposed on opposite ends of said code detectors and formed with locating slots which said code detector elements snap in said slots and the axis of said code detector elements in pre-determined positions corresponding to said pre-determined code;

said plastic material structure designed to guide said card as it is moved toward said pre-determined position and carrying spring detents adapted to cooperate with said code detector elements to yieldably hold each code detector element in different angular positions;

said code detector element provided with peripheral notches and stub shafts located at its opposite ends; with each of said slots forming a bearing for rotatably mounting one of said stub shafts with its axis in a predetermined position; and said spring detents adapted to enter said notches to yieldably hold said code detector elements in their angular position.

2. Counter means as set forth in claim 1, in which said code detector is adapted to receive a second card in a predetermined resetting position, and counter reset means are provided, which are mechanically operable by said second card to reset said counter as said second card is moved to said predetermined resetting position.

3. Counter means as set forth in claim 2, in which said code detector elements represent a predetermined resetting code, said second card is a punched coded card, said code detector elements are adapted to enter holes in said second card if, and only if, said holes in said second card also represent said resetting code, and said code detector prevents a movement of said second card to said predetermined position unless said code detector elements have entered said holes in said second card.

4. Counter means as set forth in claim 3, for use with said second card having marginal slots, which constitute said holes representing said re-setting code.

5. Counter means as set forth in claim 1, in which each of said code detector elements are moveable between at least three angular positions as said card is moved to and from said pre-determined position, and summing means are provided for integrating the extent of the successive movements imparted to one of said code detector elements said one of said code detector elements consisting of a cam portion, said cam portion in engagement with a cam follower.

6. A counter as set forth in claim 1 which comprises a resettable digit wheel, a non-resettable digit wheel, and counter reset means, which are operable to reset said resettable digit wheel without setting said non-resettable digit wheel comprising a cam wheel fixed to said resettable digit wheel.

a drive wheel associated with said resettable digit wheel, a drive wheel carrier, in which said drive wheel is rotatably mounted and which is pivotably moveable to move said drive wheel into and out of engagement with said resettable digit wheel, a stepping wheel, coaxially fixed to said non-resettable digit wheel, and a stepping rocker, which is operable to step said stepping wheel in a predetermined sense, and which is formed with a recess, said drive wheel carrier carrying a locking pin, which is adapted to enter said recess when said drive wheel is engaged with said resettable digit wheel to permit of the operation of said rocker, said locking pin being adapted to lock said rocker when said drive wheel is disengaged from said resettable digit wheel, said drive wheel carrier being arranged to move said drive wheel out of engagement with said digit wheel in response to the initiation of the operation of said counter reset means.

7. Counter means, which comprise an array of counter units, each of which comprises a counter, a code detector adapted to receive a coded punched card in a predetermined position, counter control means operable to control said counter in response to the arrival of said card in said predetermined position, said code detector comprising replaceable, pivoted code detector elements, which represent a predetermined code and are adapted to enter holes in said punched card if, and only if, said holes also represent said predetermined code, said code detector preventing a movement of said card to said predetermined position unless said code detector elements have entered said holes in said card, said code detector being adapted to receive a second punched coded card in a predetermined resetting position, each of said counter units comprising counter reset means, which are mechanically moveable by said second card as it is moved to said predetermined resetting position in the associated code detector, said code detector elements of each of said units representing a predetermined resetting code and being adapted to enter holes in said second card if, and only if, said holes in said second card also represent said resetting code, said code detector preventing a movement of said second card to said predetermined resetting position unless said code detector elements have entered said holes in said second card, said resetting code being a group code, which is common to a plurality of and less than all units of said array.

* * * * *